Figure 3:
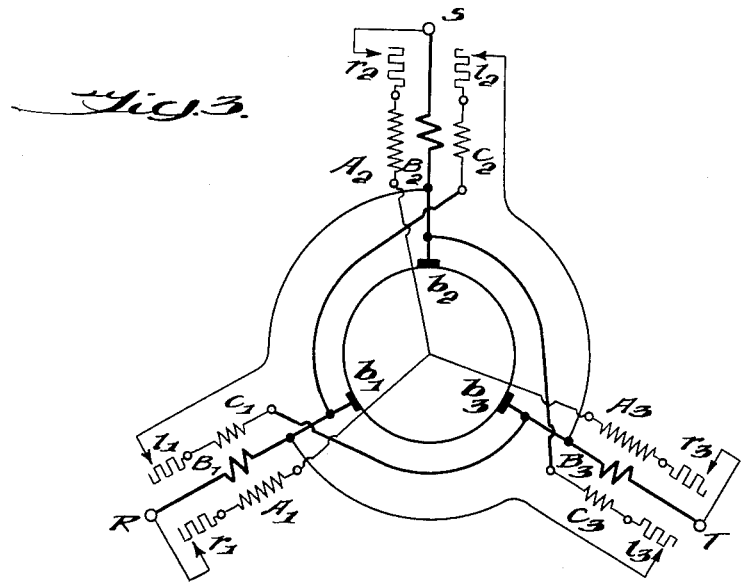

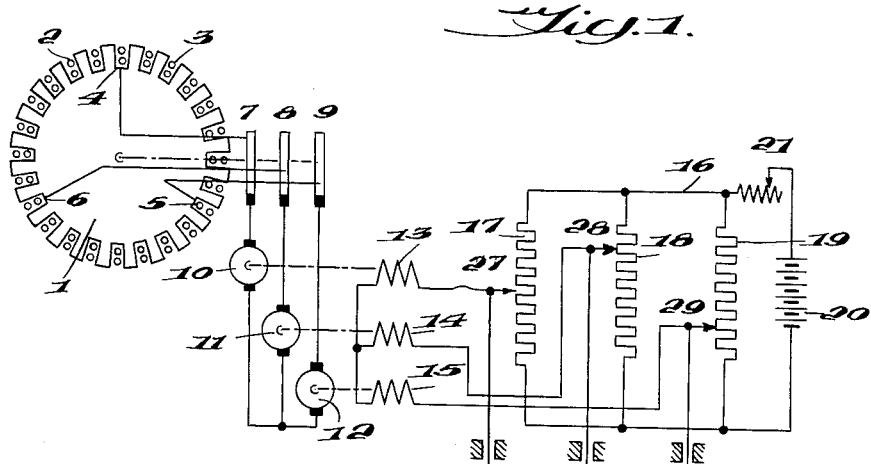

United States Patent Office 2,988,687
Patented June 13, 1961

2,988,687
TURBOROTOR WITH UNIFORM TEMPERATURE DISTRIBUTION AND ASSOCIATED EXCITER ARRANGEMENT
Georges Darrieus, Houilles, France, assignor to Aktiengesellschaft Brown, Boveri & Cie., Baden, Switzerland, a joint-stock company
Filed July 27, 1956, Ser. No. 600,500
Claims priority, application France Aug. 10, 1955
11 Claims. (Cl. 322—61)

The present invention relates to the rotor of a turbogenerator.

In turbogenerators of known design the rotor surface is only partly provided with grooves or slots. Due to the fact that the slots are usually distributed irregularly over the circumference, the rotor has different moments of inertia, which condition can be the cause of oscillations of the rotor on the double frequency of the speed. Moreover, the surface of the rotor may be heated unevenly, resulting in the creation of unequal tensile stresses in the axial direction of the rotor. Finally, a poor utilization of the rotor surface is obtained with regard to cooling.

In order to eliminate these disadvantages it is proposed, according to the present invention, to distribute the slots and the windings evenly over the entire circumference of the rotor, and to rotate the axis of the magnetic field slowly with regard to the rotor. The invention, then, concerns a turborotor with uniform temperature distribution.

According to the principle of this invention, the rotor is provided with a full drum winding inserted in slots which are uniformly distributed over the circumference, and that this winding is provided at three uniformly distributed points with tappings over which excitation by the slowly changing current has the result that an at least approximately uniform field is produced which rotates slowly with regard to the rotor.

The realization of this inventive concept can be effected in three or more phases.

In the three-phase arrangement the rotor is provided with a winding which is uniformly distributed in the grooves and which is designed like the winding of a wound rotor of an asynchronous machine. At three uniformly distributed turns, there are provided three tappings which lead to slip rings. On these slip rings are applied three exciter direct voltages which change periodically, with each phase displaced by 120 degrees slowly from a positive maximum through zero to a negative maximum and then again through zero to a positive maximum, in succession. Altogether a three-phase current of a very low frequency is put in circulation which produces a magnetic field whose axis rotates slowly with regard to the rotor.

The duration of a complete cycle varies between a "natural slip" period and about 10 minutes. By the expression "natural slip" is here understood the slip for which all the energy lost in the rotor of the main generator is supplied by the slip E.M.F.. For this method of excitation the exciter does not have to supply any energy.

Due to the fact that the current load of the conductors rotates, the latter are heated periodically, but because of the thermal capacity, all points on the rotor surface are, on the average, exposed to uniform heating. Thus harmful, uneven dilatations are avoided. Due to the uniform distribution of the grooves the moment of inertia with regard to any diameter is also uniform on the rotor. For this reason the strains induced by the weight of the rotor are absolutely uniform. Thus bending oscillations of the rotor are avoided, which otherwise would be formed. Finally, there is on the surface of the rotor, no sector with a lower temperature, which inequality would be disadvantageous for the heat emission.

The feeding of the polyphase exciting winding of the rotor with alternating current of very low and regulable frequency can be effected by means of any suitable polyphase commutator mechanism such as has been used heretofore for the compounding of the alternator or for regulating the speed by cascade coupling. In the present case the very low frequency permits the design of this exciting machine in a very simple embodiment, similar to an exciter with ordinary direct current.

The following description of two embodiments is based on the assumption that the distribution of the exciting currents is three phase.

The first solution comprises three identical exciters whose periodically varying excitation is controlled by a mechanical arrangement. The second solution comprises only a single exciter with a quasi D.-C. supply in three single phases on the basis of a special electric arrangement.

Figure 4:
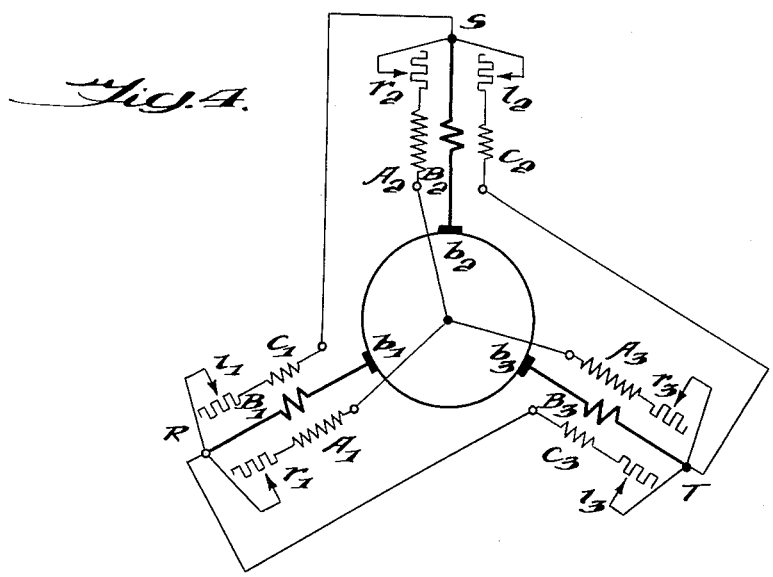

The invention will now be described in greater particularity, and with reference to the accompanying drawings, in which:

FIG. 1 diagrammatically illustrates an arrangement of the excitation according to the first solution above and FIGS. 2, 3, 4, show embodiments according to the second type of excitation.

FIG. 1 shows a section of the rotor and of the winding as well as an arrangement of the excitation.

On the rotor 1 is arranged a complete drum, star or mesh winding 3 in grooves 2 which are uniformly distributed over the circumference of the rotor. Each of the uniformly distributed taps 4, 5, and 6 is connected with one of the slip rings 7, 8, and 9. The latter are connected to the rotors 10, 11, and 12 of three identical exciter generators. Their exciting windings 13, 14, and 15 obtain time-variable voltages from a voltage divider arrangement 16. The voltage divider resistances 17, 18, and 19 are connected to a direct current source 20. Taps 27, 28, and 29 are connected with the exciting windings 13, 14, and 15 of the exciter generators. The tapping points are variously arranged by means of a crank gear 30, whose crank pins are displaced by 120 degrees with regard to each other. The rotation is effected by means of a slowly running drive 31.

The distribution of the resistances on the voltage dividers 17, 18, and 19 is so selected that a continuously rotating magnetic field of constant strength is formed in the rotor of the generator. If one has to compensate for non-linear behavior of the magnetization, due to saturation, the distribution of the resistance steps can be adapted correspondingly. For the regulation of the magnetic field strength of the principal machine a parallel resistance 21 is connected in series with the current source 20.

The rate of rotation of the crank gear is so selected that the duration of a complete turning cycle can vary between the time of a natural slip and ten minutes. Due to the slow rotation, there is no danger of substantial losses by eddy currents in the ferrous metal of the solid rotor. Furthermore, this rotation is fast enough so that no inequalities of temperature can occur on the surface of the rotor.

The second, alternative, embodiment, which is represented in FIGS. 2, 3 and 4, uses for the excitation a three-phase generator or simplified Scherbius machine, which is equivalent to a combination of three conventional direct current exciters but comprises only, for a complete field period, a minimum number of three poles, one for each.

The currents concurring in the neutral-point corresponding to a three-phase system are subject to the condition: Sigma $i$ equals 0. The excitation of each pole for the production of the variphase currents can be effected in known manner, for example, in a shunt, in a series connection, by an independent source, or by a combination with one of these types of excitation. However, the phase connection of the feed of these exciting windings is important.

If the circuits of excitation of one particular phase are fed exclusively by the same currents, or the voltage of this phase, and if it is pre-supposed that the turbogenerator is disconnected from the mains, one system of constant currents will develop by self-excitation in the different phases, subject only to the condition: Sigma $i=0$. These currents yield on the turbogenerator a distribution of the field which does not change with the time, so that the turbogenerator runs synchronously.

In order to obtain a more or less slowly rotating field with regard to the rotor, the exciting windings must be combined in a special manner. Apart from the former exciting windings each pole is provided by, additional exciting windings connected to a neighboring phase, in order to realize for the resulting excitation an appropriate exciting current which produces a slow periodic change of the currents in the three phases.

As an example of this embodiment the exciter of FIG. 2 is a three-phase machine with three rows of brushes $b1$, $b2$, $b3$, which are displaced by 120 degrees. It is assumed that the rotor winding is an ordinary drum lap winding with a winding pitch of 120 degrees and that the connection to the commutator of each coil is, as usual, in the plane of symmetry of the coil. It can be easily seen that the 120 degree sector of the winding surface, for which the brush $b1$ lies on the center line, carries two current layers, corresponding to the outer and inner winding layer in each slot, and that these conductor layers pertain to the winding parts which are separated by this brush along the winding. If the respective signs of these conductor currents in the slots are taken into consideration, it can be recognized that the current in one brush or the difference of the currents in the two adjacent windings is proportional to the resulting linear current density on the 120° sector of the armature independently of the current distribution in the rest of the winding.

Thus pole P1, which belongs to phase 1, must be opposite brush $b1$. On the pole P1 are arranged the series windings B1, as well as the additional windings A1, C1. The windings are connected, for example, according to FIGS. 3 and 4.

In the wiring diagrams of FIGS. 3 and 4 the exciting windings B1, B2, B3 are connected in series with the phase conductor. The exciting windings A1, A2, A3 are shunt windings which are provided with field rheostats $r1$, $r2$, $r3$. The windings are connected in a neutral point. In FIG. 3 the out-of-phase excitation, which causes the slip, is obtained by additional exciting windings C1, C2, C3 which are connected to the brushes which are laid off in the respective case, that is $b2$, $b3$ or $b3$, $b1$ or $b1$, $b2$, with the interposition of rheostats $l1$, $l2$, $l3$; by which the slip can be adjusted.

In FIG. 4 the additional exciting windings C1, C2, C3 are connected, on the one hand, to the terminals of the associated phase and, on the other hand, to the terminals of another phase, namely to RS, ST, TR (or symmetrically to RT, SR, TS). They produce at the same time an out-of-phase component and one in phase component, which is under certain circumstances better for the functioning of the A.-C. generator under load, for which functioning the resulting magnetic flux (which determines the E.M.F. produced by the slip) is not in phase with the ampere turns in the rotor windings.

From FIG. 3 it can be seen that the field control is determined by the rheostats $r1$, $r2$, $r3$ which are inserted in the shunt circuits A1, A2, A3, while the control of the slip is effected by the rheostats $p1$, $p2$, $p3$ which are connected to the out-of-phase circuits C1, C2, C3. In FIG. 4 the control of the field is effected mainly by the rheostats $r1$, $r2$, $r3$ which are connected to the shunt circuits A1, A2, A3 and partly by the rheostats $l1$, $l2$, $l3$, which are connected to the individual phase circuits C1, C2, C3. The latter rheostats also effect the control of the slip.

In the same manner the feeding of the windings A1, A2, A3 can, according to the invention, be effected by arbitrarily dephased voltages, provided these voltages do not coincide with those feeding the circuits C1, C2, C3. The rheostats $r1$, $r2$, $r3$, as well as the rheostats, $l1$, $l2$, $l3$ concur to the control of the slip and of the field in a variable ratio.

It is possible according to the invention to omit the system of the series windings B1, B2, B3 and to operate only with the windings A1, A2, A3 and C1, C2, C3. In the same manner, one of the two winding systems A1, A2, A3 or C1, C2, C3 could be omitted and the regulation of the field and of the slip could be effected by means of a single winding which is fed with a current of suitable phase position and which depends on a single rheostat. In this case the series winding can be maintained or omitted. But in such case, it is no longer possible independently to control the amplitude of the exciting current and the extent of the slip, which parameters are also necessarily connected one with the other.

In the diagrams of FIGS. 3 and 4 the windings C1, C2, C3 could be connected to independent current sources. These current sources would have to be of the same type as represented in FIG. 1, where the slip frequency is determined mechanically. It is also possible to use a polyphase excitation corresponding to the above described method.

With the various arrangements according to the invention it is possible to improve the stability of the generator. In order to avoid a falling out (aussertrittfallen) with load currents, the magnetic polar axis can be displaced for a short time by a suitable angle.

The application of a complete drum winding requires coil ends which have normally a large projection. In view of the increased centrifugal forces it is desirable to keep these projections as short as possible. To this end, the cross section of the conductor can be reduced under the cap ring. The projection can also be reduced by using a shorter winding pitch.

The absolutely uniform distribution of the conductors in the drum windings results in an improved distribution of the magnetomotive forces at the circumference of the rotor. A better conformity of the magnetic field to the basic sinusoidal form is obtained, and with a moderate shortening of the winding pitch there is practically no loss in magnetic flux.

I claim:

1. Means for equalizing the temperature distribution in a massive turbogenerator rotor having a plurality of grooves evenly distributed over the entire periphery thereof and a winding having a plurality of coil sides mounted within said grooves, said winding having at least three evenly distributed winding taps so that the rotor body presents in each diameter a substantially equal moment of inertia, comprising means for applying cyclically varying out of phase exciting currents across said winding taps to produce a substantially uniform magnetic field which rotates about the rotor periphery slowly with respect to the rotor speed to thus achieve uniform temperature distribution.

2. A turborotor as defined in claim 1, characterized in that the tappings of the drum windings are connected over slip rings to the terminals of a direct current machine with at least three poles, said machine being provided in the polar axis with brushes and said poles being provided with exciting windings of which one each is traversed by the current of the brushes associated with the pole, and a winding connected to the voltage of the brush associated with the pole, and that a third winding is provided which is traversed by out-of-phase currents with regard to the current of the winding of the associated brushes.

3. A turborotor as defined in claim 2, further characterized in that the windings on the poles of the direct current machines are fed by the currents of the associated brushes, two additional windings being provided of which one is a series winding and the other a shunt winding, a rheostat being connected in series with the shunt winding, and in that those windings which are fed with out-of-phase current are also provided with a series rheostat and connected in a shunt to two other phases.

4. A turborotor as defined in claim 3 further characterized in that the additional windings of the direct current machine are connected with the series rheostats in a shunt between the phase under consideration and another phase.

5. A turborotor as defined in claim 3, further characterized in that instead of the shunted additional winding a second additional winding is provided in the direct machine which is no longer fed by a current in phase but is fed by an out-of-phase current, and in that the windings are also provided with rheostats connected in series.

6. A turborotor as defined in claim 3 further characterized in that the series winding in the direct current machine is replaced by a shunt winding and an additional winding.

7. A turborotor as defined in claim 6, further characterized in that the shunt winding in the direct current machine is replaced by a second suitably dephased additional winding and that the latter is connected in series with a rheostat.

8. A turborotor as defined in claim 3, characterized in that at least one of the dephased additional windings is fed by at least one auxiliary current source which is controlled by out-of-phase currents supplied by one of the principal exciters or a similar machine.

9. Apparatus as defined in claim 1 wherein said means for applying the cyclically varying exciting current comprises slip rings electrically connected respectively to each of the winding taps, each of said slip rings having a separate direct-current exciter generator connected thereto, the exciting windings of said direct-current exciter generators being connected respectively to voltage divider networks connected in parallel to a direct-current voltage source, each of said voltage dividers having sliding contacts, and gearing means for cyclically displacing said sliding contacts to apply periodically variable and out of phase exciting voltages to the exciting windings of said exciter generators.

10. Apparatus as defined in claim 1 wherein said means for applying the cyclically varying exciting current comprises slip rings electrically connected respectively to each of the winding taps, and a rotary induction regulator electrically connected to said slip rings to apply periodically variable and out of phase exciting voltages to the winding of said turborotor.

11. A apparatus as defined in claim 1 wherein said means for applying the cyclically varying exciting current comprises slip rings electrically connected respectively to each of the winding taps, and a polyphase commutator electrically connected to said slip rings to apply periodically variable and out of phase exciting voltages to the winding of said turborotor.

References Cited in the file of this patent
UNITED STATES PATENTS

| | | |
|---|---|---|
| 478,142 | Sperry | July 5, 1892 |
| 522,580 | Bell | July 10, 1894 |
| 729,269 | Buck | May 26, 1903 |
| 1,059,771 | Scherbius | Apr. 22, 1913 |
| 1,328,519 | Hull | Jan. 20, 1920 |
| 2,014,737 | Japolsky | Sept. 17, 1935 |
| 2,743,411 | Abell et al. | Apr. 24, 1956 |